W. L. TOBEY.
AUTOMOBILE.
APPLICATION FILED AUG. 22, 1912.
1,059,579.
Patented Apr. 22, 1913.
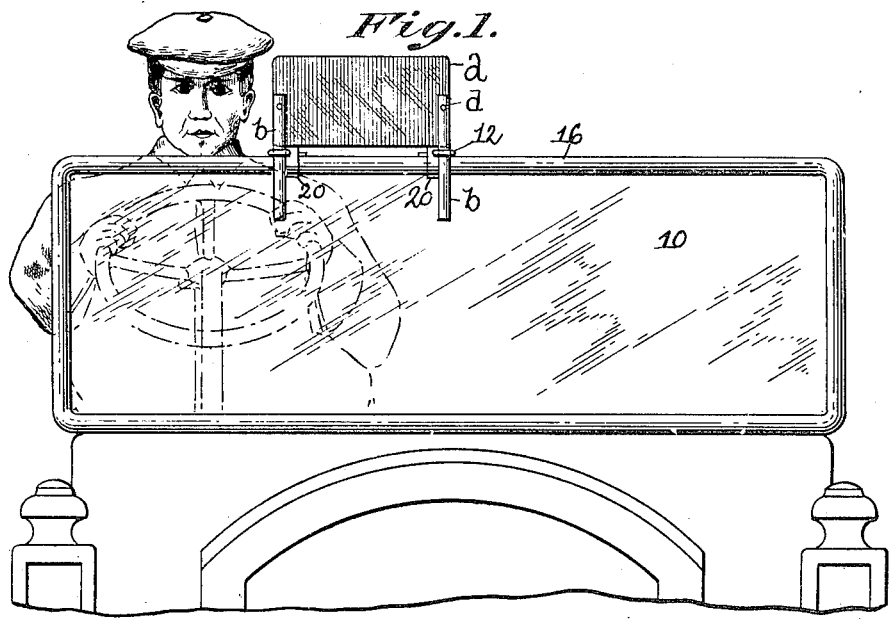
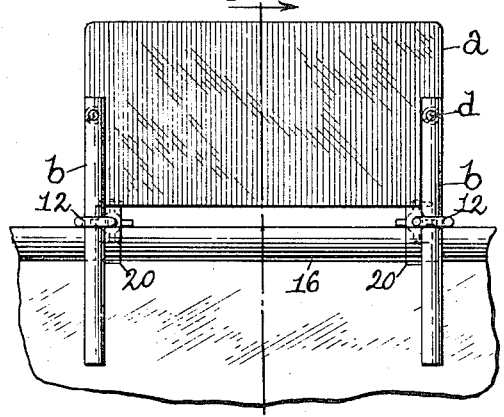
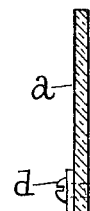
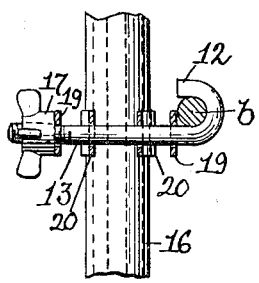
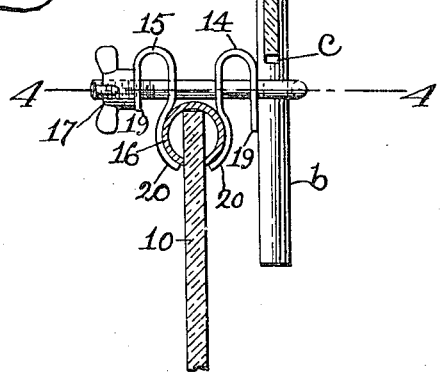
Witnesses:
M. G. Crozier
J. Murphy
Inventor,
William L. Tobey
by Jas. H. Churchill
Atty.

UNITED STATES PATENT OFFICE.

WILLIAM L. TOBEY, OF WINTHROP, MASSACHUSETTS.

AUTOMOBILE.

1,059,579.  Specification of Letters Patent.  Patented Apr. 22, 1913.

Application filed August 22, 1912. Serial No. 716,462.

*To all whom it may concern:*

Be it known that I, WILLIAM L. TOBEY, a citizen of the United States, residing in Winthrop, county of Suffolk, and State of Massachusetts, have invented an Improvement in Automobiles, of which the following description, in connection with the accompanying drawings, is a specification, like letters on the drawings representing like parts.

This invention has for its object to prevent or at least reduce to a minimum accidents on the highways, due to vehicles equipped with bright headlights, approaching each other and especially on narrow roads.

This invention is especially applicable to automobiles equipped with acetylene or other bright headlights.

To this end, the automobile is provided with a screen of suitable material, which is secured to the automobile in front of the chauffeur or driver and which is sufficiently opaque to cut off or reduce the intensity of the rays of lights from an approaching automobile, and said screen is located so that the driver can move his head to bring the screen between his eyes and the headlight or headlights of the approaching automobile, without cutting off the vision of the driver from the road in front of him.

The screen referred to may be of wood, metal or any other opaque or substantially non-transparent material, or it may be preferred to use a plate of smoked or colored glass, which may be detachably secured to the wind shield or other part of the vehicle located in advance of the driver's seat and extending transversely of the vehicle.

These and other features of this invention will be pointed out in the claims at the end of this specification.

Figure 1 represents in elevation a sufficient portion of an automobile provided with the invention to enable it to be understood. Fig. 2, a detail on an enlarged scale of the screen shown in Fig. 1. Fig. 3, a section on the line 3—3, Fig. 2, on an enlarged scale, and Fig. 4, a section on the line 4—4, Fig. 3.

Referring to the drawing, $a$ represents a screen, which may be a plate of metal, smoked or colored glass, wood or other opaque or substantially opaque material, and which is suitably supported in advance of the driver or chauffeur.

In the present instance, the screen $a$, which may be supposed to be smoked or colored glass, is secured to a suitable supporting frame, comprising two metal rods or tubes $b$, which form posts and are provided at their upper end with slots $c$ for the reception of the glass plate or screen $a$, which is represented as secured to said posts by screws $d$. The screen $a$ may be conveniently secured to the wind shield, and in the present instance, it is represented as secured to the lower part 10 of the wind shield now so commonly used.

Provision is made for detachably securing the screen $a$ to the part 10 of the wind shield, and to this end, each rod or tube $b$ is engaged by the hooked end 12 of a threaded rod 13, which is passed through holes or openings in clamping members or devices 14, 15, which are designed to engage the opposite sides of the top bar 16 of the part 10 of the wind shield, and to be forced against the same by a nut 17 engaging the threaded end of the rod 13. Each of the clamping members 14, 15, herein shown, consists of a piece of spring metal, which is bent to form arms 19, 20, one of which bears against the top bar or rod of the wind shield and the other arm of one member bears against the rod $b$, and that of the other member against the nut 17.

By loosening the nuts 17, the screen can be moved longitudinally of the wind shield and laterally with relation to the driver of the car, so as not to obstruct his view when looking straight ahead, but so as to be in convenient range of a slight movement of his head, whereby the screen may be interposed between his eyes and the rays of light from the nearer headlight of an automobile approaching in the opposite direction, without obstructing his view of the road straight in front of him. As a result, the driver of the car is not dazzled or blinded by the glare of light from the approaching automobile, but he is enabled to clearly see the approaching car and judge of the distance at which they can pass with safety, thereby avoiding collisions due to errors of judgment in this respect. So also, by loosening the nuts 17, the posts $b$ may be moved vertically to adjust the screen to different operators.

In the daytime, the screen may be quickly and easily removed from the wind shield and stored away in the car if desired, and at night can be quickly and easily applied, or it can be left on the wind shield and moved to the end of the wind shield remote from the operator.

It may be preferred to attach the screen to the wind shield, as this structure is conveniently placed and forms part of the equipment of a large number of cars, but it is not desired to limit the invention in this respect, as the screen can be secured to the dasher of those cars not provided with a wind shield.

In the present instance I have shown one form of frame for the screen, and one means for detachably securing the screen in its operative position on the car, but I do not desire to limit the invention in this respect.

In the present instance, the screen is shown as applied to an automobile in which the driver is seated on the right hand side, but it is equally adapted to machines having a left hand drive, as the screen could be located to project slightly beyond the side of the wind shield.

Claims—

1. The combination with the glass windshield of an automobile, of a screen of the character described, a post to which said screen is secured, a rod engaging said post and extended transversely of the windshield, spring clamping members engaging said windshield and having arms through which said rod is passed, and means on said rod to render said clamping members effective to secure said screen to said windshield.

2. The combination with the glass windshield of an automobile, of a screen of the character described, a support for said screen having an upright member to which the screen is secured, and a horizontal member extended transversely of the windshield, and yielding means for securing said horizontal member to said windshield.

3. A screen for automobiles comprising a body portion of the character described, a post slotted at its upper end into which said screen is inserted, means to secure said screen in said slot, a rod hooked at one end to engage said post, spring clamping members having arms through which said rod is passed, and means on the other end of said rod for rendering said clamping members effective to secure the screen to its support.

In testimony whereof, I have signed my name to this specification in the presence of two subscribing witnesses.

WILLIAM L. TOBEY.

Witnesses:
 JAS. H. CHURCHILL,
 J. MURPHY.